Sept. 6, 1949.  G. C. A. ALRIC  2,480,894
PROCESS FOR MANUFACTURING KNITTED FABRIC
Filed July 26, 1947  2 Sheets-Sheet 1
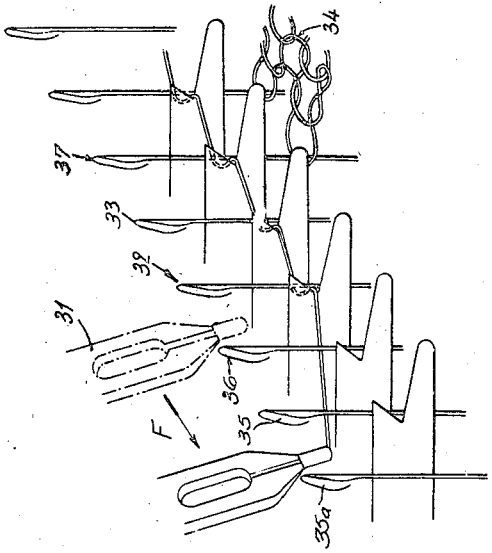
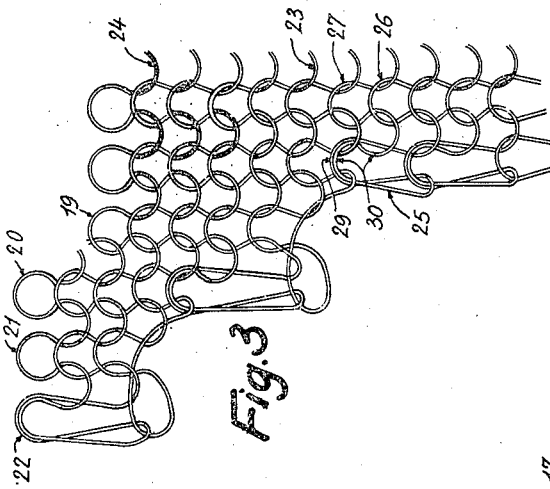
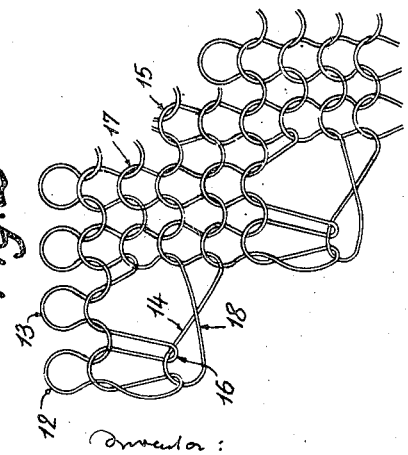
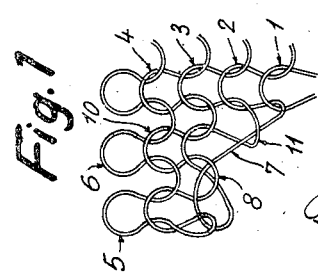

Sept. 6, 1949. G. C. A. ALRIC 2,480,894
PROCESS FOR MANUFACTURING KNITTED FABRIC
Filed July 26, 1947 2 Sheets-Sheet 2
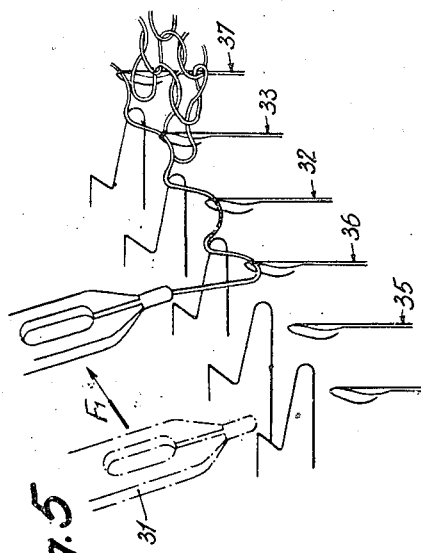
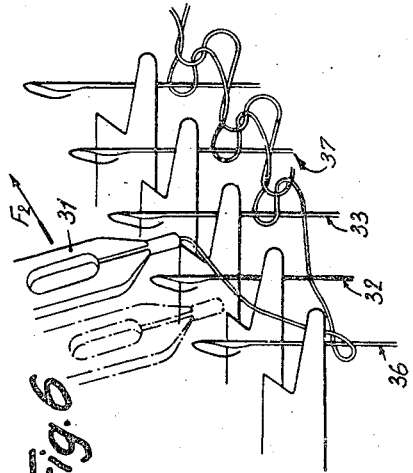
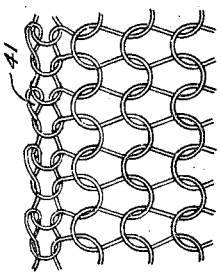
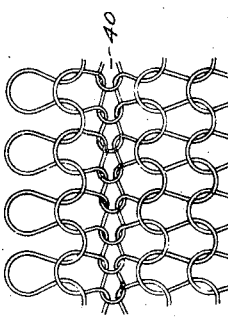
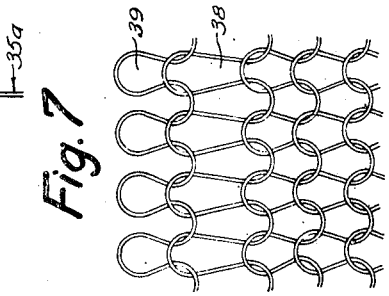

Patented Sept. 6, 1949

2,480,894

UNITED STATES PATENT OFFICE 2,480,894

PROCESS FOR MANUFACTURING KNITTED FABRIC

Gustave Charles Auguste Alric, Troyes, France

Application July 26, 1947, Serial No. 763,973
In France June 26, 1946

Section 1, Public Law 690, August 8, 1946
Patent expires June 26, 1966

4 Claims. (Cl. 66—89)

The object of the present invention is bordered hosiery knitted fabric, and has more especially for object a knitted fabric of this type which presents in this border a series of increases.

It has already been proposed to execute the widening of a knitted fabric by moving the leader by the amount of a needle outwards during the knocking over. The method consisting in displacing the leader by the amount of a needle at the looping and by the amount of a needle at the knocking over is also known. These two systems have the disadvantage that the leader is from time to time on the sinker loops, this preventing its being placed between these sinker loops.

To avoid these mishaps, it has been proposed to combine the displacement of the leader with an increase by the amount of one needle by means of a transferring hook. This last process has a double disadvantage: the presence of a hole at each increase and a loss of time for the transfer.

The knitted fabric according to the invention is characterized by the fact that it includes two supplementary loops for each row of loops comprising an increase, without transfer holes.

The said knitted fabric can be characterized, independently of the increase by the fact that the border loop occupies two rows, its upper loop comprising two threads.

The process according to the invention consists, substantially, in displacing the leader by the amount of two needles outwards during the looping and to bring it back by an even number of needles inwards in the course of the knocking over.

According to this process, it is possible to bring back the leader inwards either by the amount of two needles, and in this case only one needle is encircled, or by the amount of four needles and in this case two needles are encircled.

It is possible, in the execution of the present process, to use the normal method of constitution of the border, into which the border loop is knocked over at each row.

According to a variation, the border loop next to the leader is knocked over, the opposite border loop not being knocked over and constituting a double loop. The border loops are therefore knocked over only one row every two rows.

To obtain this result, the pressing is done at a given height, intermediate between the height generally adopted and the average line of the loops previously made. This operation, owing to the fact that the border loop is higher than the other loops when the leader is not on the same side, permits the knock-over of this loop when the leader is on its side, but prevents it from doing so when it is on the opposite side. Under these conditions, the border loop occupies two rows.

The displacements of the leader and the movement of the various necessary organs to put in operation the two supplementary needles for exact increase operation are made in a manner well known to the hosiery trade technicians.

As a particular application of the present process, and an example of a particular knitted fabric, the invention covers namely the new article of manufacture constituted by a hose or ankle stock started by the tip and comprising the general characteristics of the knitted fabric.

This hose can, moreover, be characterized by the fact that it comprises either an upper part of hose different from the lower part and linked by interlacing or seamed, or a seam made in a direction perpendicular to the textile when the same is in slack condition. As a variation of this last method of execution, it is possible, naturally, to foresee several similar lines, this preventing the rolling of the upper part of the hose and cancelling the ladder loop lines starting from the back.

The following description, together with the drawing hereto attached given as an example and not in a limiting sense, will help to understand how the invention may be performed, the characteristics which stand out as much from the text as from the drawing being part, naturally of the invention.

Fig. 1 shows a fragment of the knitted fabric having increases according to the invention, the border being knocked over at each row according to the usual method.

Fig. 2 shows a variation of the knitted fabric of Fig. 1.

Fig. 3 shows a fragment of knitted fabric having increases according to the invention, but in which the border loop is knocked over only one row out of every two.

Figs. 4, 5 and 6 show the relative position of the needles and of the leader, during the execution of a knitted fabric according to the invention.

Figs. 7, 8 and 9 show three steps of the completion of a knitted fabric, namely, a hose according to the invention.

As shown in Fig. 1, the knitted fabric comprises a given number of rows such as 1, 2, 3, 4, which have only been partly shown so as to be seen in a clear manner. It is characterized by the fact that it comprises, for a given row of loops such as 3, two supplementary rows of loops 5 and 6. The border is of the known type, having one loop knocked over per row.

In this method of execution, the thread 7, which has constituted the row 2, then passes, onwards and backwards through the loop 8, then encircles the base of the loop 10, crossing again in 11 before constituting the row 3.

The knitted fabric shown in Fig. 2 comprises, as the fabric of Fig. 1, two supplementary rows of loops 12 and 13, starting from a same row. In this variation, the thread 14 which has constituted the row 15 passes only once in the loop 16 and carries on directly to constitute the row 17, after crossing in 18. The presence of the opening or hole in the drawing is because the border has been shown slack, for a better comprehension of the invention.

Fig. 3 shows another variation of the knitted fabric according to the invention, in which are found again two supplementary row of loops 19, 20 and 21, 22 for a same row 23 and 24 respectively. This variation is characterized by the fact that each border loop such as 25, occupies two rows 26 and 27. The upper part of this loop comprises then two threads, one, 29, corresponding to row 26, and the other, 30, which carries on to constitute row 27.

Figs. 4, 5 and 6, show three stages of the manufacture of a knitted fabric according to the invention. In the normal method, at the end of the looping, the leader 31 is stopped in the position shown by the dotted line (Fig. 4), on the sinker placed between the needles 32 and 36. According to the invention, the leader is displaced by the amount of two needles in the direction of the arrow F, so that it stops on the sinker between the needles 35 and 35a.

During the knocking over (Fig. 5) the leader 31 is displaced inwards by the amount of two sinkers, in the direction of the arrow F1, so as to be brought back between 32 and 36. The thread is picked up by the needles 32 and 36.

The knocking over being done, the needles rise (Fig. 6) and the leader moves in the direction of the arrow F2 towards the other end of the knitting. The needle 36 is encircled and the knitted fabric of Fig. 1 is obtained, if the border loop is knocked over at each row; and the knitted fabric of Fig. 3 is obtained if this loop is knocked over once every two rows.

During the knock over step, the leader may be brought back between 33 and 37, instead of between 36 and 32, that is to say, moved by the amount of four needles instead of two. In the next step, the needles 36 and 32 are encircled and the knitted fabric of Fig. 2 is obtained.

As an application of the process and of the knitted fabric which have just been described, the present invention covers also the industrial article of manufacture constituted by a hose or ankle sock started by the tip.

Until now, this method of starting a hose was impossible, because of the great number of increases, very difficult to be done by the old processes, necessary for such a manufacture.

When the hose is started by the tip, according to the present invention, the increases which were made in a small number in the old process, become, naturally, diminishing made very easily. However the numerous old diminishings become increases, which the present process enables to carry out easily.

The problem to solve is the upper part of the hose. It is possible to finish the hose in the methods shown in the Figs. 7 to 9. First a one before last of slack row of loops 38 is made, then the knitting is stopped at the next row 39.

Then this slack row of loops is interlaced by a seam 40 (Fig. 8) perpendicularly to the body of the hose. The row 39 is then cancelled and a border is obtained 41 (Fig. 9) finishing the hose.

It is possible, naturally, to carry out the execution of several slack rows of loops, separated from each other by a given number of normal row of loops, and have formed on each slack row of loops a perpendicular seam similar to the seam 40 of Fig. 8.

It is also possible to realize a transversal border 41 on any hosiery article which would prove advantageous to be finished in this manner.

The methods of realization which have just been described are naturally examples not given in a limiting sense, and any modifications in shape or form can be made, without for this reason, depart from the spirit and scope of the invention.

What I claim is:

1. In a hosiery knitted fabric manufacturing process, the step which consists in moving the leader by the amount of two needles outwards during the looping and in bringing it back by an even number of needles inwards during the knocking over.

2. In a hosiery knitted fabric manufacturing process, the step which consists in moving the leader by the amount of two needles outwards during the looping, and in bringing it back by the amount of two needles during the knock-over.

3. In a hosiery knitted fabric manufacturing process, the step which consists in moving the leader by the amount of two needles outwards during the looping and in bringing it back by the amount of four needles inwards during the knock-over.

4. In a hosiery knitted fabric manufacturing process, the step which consists in moving the leader by the amount of two needles outwards during the looping, in bringing it back by an even number of needles inwards during the knock over, and in knocking over the border loop only once every two rows when the leader is on the side of the said loop.

GUSTAVE CHARLES AUGUSTE ALRIC.

REFERENCES CITED

The following references are of record in the file of this patent:

UNITED STATES PATENTS

| Number | Name | Date |
|---|---|---|
| 1,893,588 | Montagne | Jan. 10, 1933 |
| 1,998,368 | Heinitz | Apr. 16, 1935 |
| 2,062,221 | Heinitz | Nov. 24, 1936 |
| 2,230,986 | Somers | Feb. 4, 1941 |
| 2,263,763 | Edwards | Nov. 25, 1941 |
| 2,268,751 | Harris | Jan. 6, 1942 |
| 2,288,672 | Berger | July 7, 1942 |
| 2,296,590 | Badders et al. | Sept. 22, 1942 |
| 2,298,302 | Mack | Oct. 13, 1942 |
| 2,301,469 | Smetana | Nov. 10, 1942 |
| 2,330,199 | Basch | Sept. 28, 1943 |
| 2,330,445 | Patton | Sept. 28, 1943 |
| 2,340,266 | Goodman | Jan. 25, 1944 |
| 2,409,138 | Mack | Oct. 8, 1946 |

FOREIGN PATENTS

| Number | Country | Date |
|---|---|---|
| 483,546 | Great Britain | Apr. 14, 1938 |